United States Patent [19]

Granlund

[11] Patent Number: 4,648,574

[45] Date of Patent: Mar. 10, 1987

[54] ROTARY STAND

[75] Inventor: Ingvar Granlund, Eskilstuna, Sweden

[73] Assignee: Axhamre International AB, Gothenburg, Sweden

[21] Appl. No.: 802,708

[22] Filed: Nov. 26, 1985

Related U.S. Application Data

[63] Continuation-in-part of Ser. No. 673,906, Nov. 21, 1984, abandoned, which is a continuation-in-part of Ser. No. 673,907, Nov. 21, 1984, abandoned.

[51] Int. Cl.$^4$ ................................................. A47F 5/02
[52] U.S. Cl. .................................. 248/349; 108/103; 248/1; 248/186; 248/285
[58] Field of Search ............... 248/349, 186, 285, 1 B, 248/1 E, 662, 1; 108/102, 103, 104, 78; 312/282

[56] References Cited

U.S. PATENT DOCUMENTS

| | | | |
|---|---|---|---|
| 2,560,679 | 7/1951 | Zalkind | 108/102 |
| 3,285,561 | 11/1966 | George | 248/349 |
| 3,479,632 | 11/1969 | Galles | 248/349 X |
| 3,762,275 | 10/1973 | Imamura | 248/349 X |
| 4,275,779 | 6/1981 | Rowe | 248/349 X |
| 4,305,563 | 12/1981 | Presson | 248/349 |
| 4,561,619 | 12/1985 | Robillard et al. | 248/349 X |

FOREIGN PATENT DOCUMENTS

| | | | |
|---|---|---|---|
| 3132015 | 10/1982 | Fed. Rep. of Germany | 248/1 B |
| 1514135 | 2/1968 | France | 108/103 |
| 2416669 | 10/1979 | France | 108/103 |

OTHER PUBLICATIONS

IBM Technical Disclosure Bulletin, vol. 22, No. 7, Dec. 1979.

*Primary Examiner*—J. Franklin Foss
*Assistant Examiner*—David L. Talbott
*Attorney, Agent, or Firm*—Harness, Dickey & Pierce

[57] ABSTRACT

An improved rotary stand, particularly intended to be used as a work table to support a table computer terminal and comprising a disc which is rotatably mounted on a thrust bearing. The disc is provided with a pull-out leaf. The leaf is movable between an inner end position for use when the stand is to be rotated, and an outer end position for use when work is to be carried out on the computer terminal. In the inner position, the leaf will be located interiorly of the edge of the stand in order not to prevent the rotational movements of the latter. The leaf is provided with feet which, in the outer position of the leaf, are arranged to abut against the support.

8 Claims, 4 Drawing Figures

ROTARY STAND

CROSS REFERENCE TO RELATED APPLICATIONS

This application is a continuation-in-part of my applications Ser. No. 673,906 now abandoned which is a continuation-in-part of Ser. No. 673,907 now abandoned, each filed Nov. 21, 1984 and entitled "Improved Rotary Stand".

BACKGROUND OF THE INVENTION

The subject invention concerns an improved rotary stand comprising a shelf, the lower face of which is provided with a thrust bearing consisting of two parts, one of which is supported in direct contact with or essentially in direct contact with a support face, such as a table top.

The rotary stand in accordance with the invention is suitable for use in a variety of different applications but it is particularly useful and suitable as a work table to support table computers, such as word processing units, table terminals and similar units. It is likewise possible to use the stand in accordance with the invention to support telephones, intercom apparatuses, binders, books, et cetera.

Table terminals essentially comprise a keyboard and a display. The display may be combined with a central processing unit. The keyboard and the display are separate but interconnected units. The distance by which the units are spaced apart may, on the whole, be chosen at liberty but, in practice, the display is as a rule positioned on the table top in a certain position in front of the operator and the keyboard is positioned in front of the display. The distance between the operator and the display is determined by the distance that the operator finds suitable to work actively with the display. The display, which may be comparatively heavy and bulky, is not moved aside when not actually in active use but remains in the position facing the operator, in comparative close proximity to the operator. From a sanitary point of view, this is quite unsuitable considering that the radiation from the display may be harmful.

Prior art technology fails to indicate a work table which may be suitable for use with computer terminals and which solves the problems outlined above. One type of conventional rotary work tables or rotary stands comprises a shelf which is mounted on a column or center shaft which is mounted in a cross member. Because of their structure, work tables of this type are comparatively high and for this reason alone they are not particularly suitable to be mounted on a desk or similar work table tops. In addition, their height makes them unstable and this condition is aggravated by the reduced support that is provided by the arms extending away from the cross member. Displays are very heavy units, particularly when they comprise a central processing unit, which means that work tables of conventional design and technology are positively unsuitable to support computer terminals.

SUMMARY OF THE INVENTION

The purpose of the subject invention is to provide an improved rotary stand which above all is suitable for use as work tables supporting computer terminals. The rotary stand in accordance with the subject invention comprises a support disc, a thrust bearing provided on the lower face of said support disc, said thrust bearing consisting of two sections, one of which rests in direct or in essentially direct contact with a base, such as a table, said rotary stand intended to serve as a working table to support a computer comprising a display and a keyboard. The stand is characterized by the fact that said support disc is provided with a leaf for support of said computer keyboard, said leaf arranged to be pulled outwards from the support disc into a keyboard utilizing position, in which position said leaf is arranged to abut against the base and prevent rotation of the support disc, said leaf arranged to be displaced from the pulled-out keyboard utilizing position inwards over the support disc to facilitate rotation of the rotary stand and setting thereof in a different angular position.

In accordance with one aspect of the invention, feet are provided on the lower face of said leaf, said feet arranged to abut against the base when said leaf is in its pulled-out position corresponding to the keyboard utilization position.

BRIEF DESCRIPTION OF THE DRAWINGS

The rotary stand in accordance with the invention will be described in closer detail in the following with reference to the accompanying drawings, wherein.

DETAILED DESCRIPTION OF A PREFERRED EMBODIMENT

Figure 1:
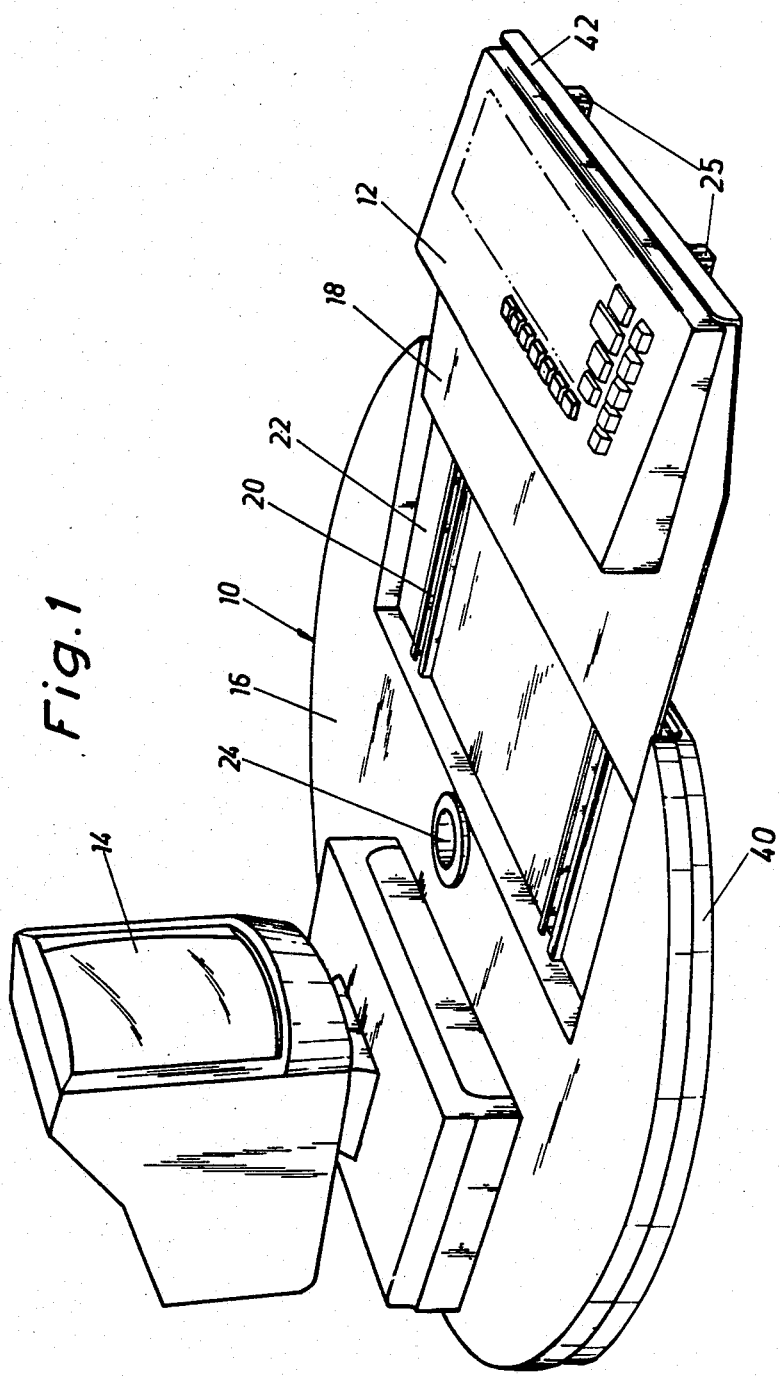
FIG. 1 is a perspective overall view of an improved rotary stand in accordance with the subject invention when used as a work table supporting a computer terminal or word-processing unit.

FIG. 1 illustrates the rotary stand in accordance with the invention as conceived for use as a work table top to support computer terminals. The terminal comprises a keyboard 12 and a display 14 both of which may be parts of a word-processing installation. The rotary stand comprises a rotary disc or shelf 16. From the latter, a segment is cut out to provide space for reception therein of a pull-out leaf 18 which is intended to support the keyboard 12. The leaf 18 is provided with rails 19 which are mounted for sliding movements in rails 20 attached to a bottom plate 22 which is somewhat larger than the cut-out segment of the shelf 16 and which is secured to the lower face of the latter. The leaf 18 and the plate 22 preferably are made of metal. Owing to this construction of the shelf 16, the leaf 18 will be positioned level with the upper face of the shelf 16. The latter is provided with an aperture 24 in the middle through which wiring (not shown) leading to the terminal units may be drawn. On the lower face of the leaf 18 adjacent its outer edge is provided a support in the shape of two feet 25. The latter move into abutment against the support when the leaf 18 is in its pulled-out position and the operator starts writing on the keyboard. The abutment of the feet against the support also prevents unwanted turning movements of the shelf 16 when the leaf is in its pulled-out position.

It is essential that the level of the shelf 16 is as close as possible to the level of the table top and that the rotary stand is stable. This is achieved by a bearing member, such as a thrust bearing 26 including balls, which is designed to be positioned directly on the table top. In addition, the diameter of the thrust bearing 26 should exceed the height thereof. The difference in heights preferably is in the magnitude of several factors. The thrust bearing is positioned on a support which may be a table top 32. For this reason, the thrust bearing 26 is provided with a rubber lining 34 to increase the friction against the support. The rubber lining may be replaced by tabs or the like.

Figure 2:
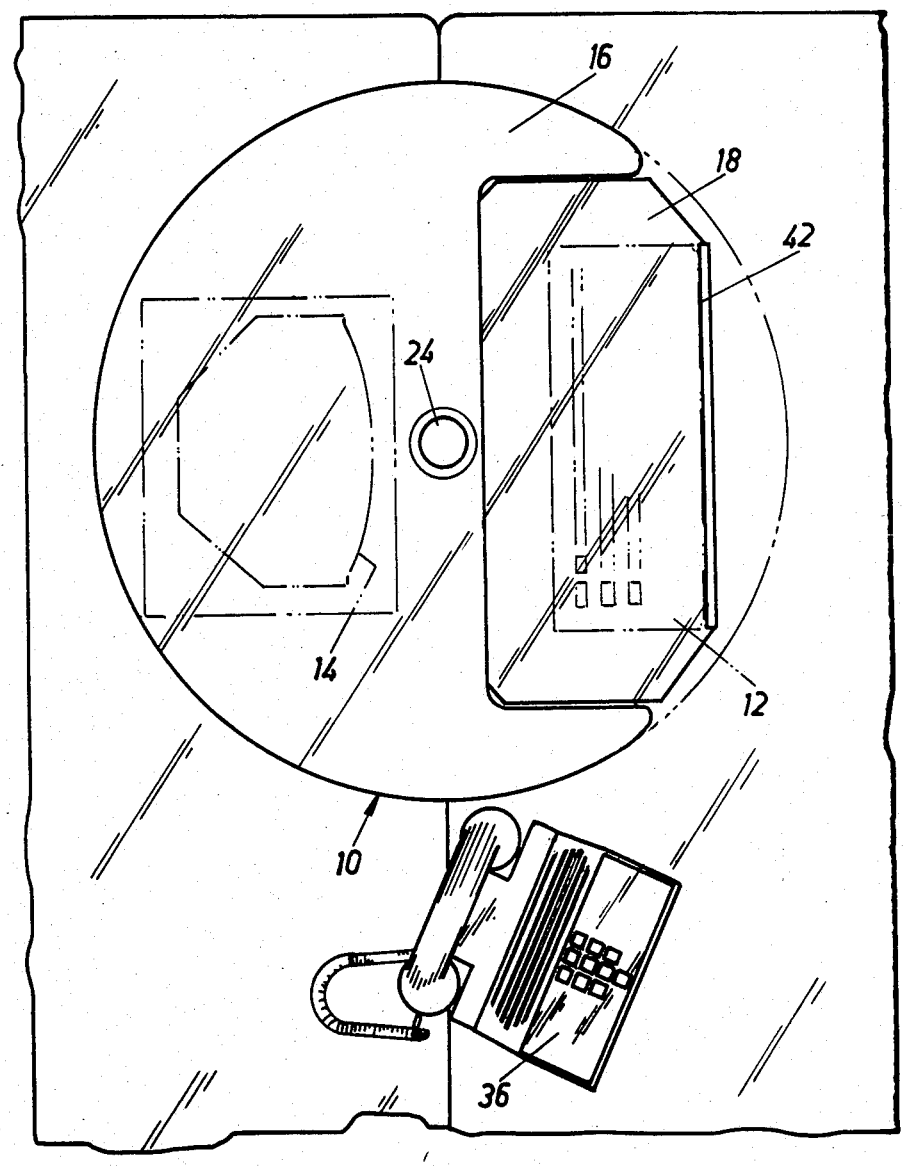
FIG. 2 is a plan view of the rotary stand of FIG. 1, shown in its inner, pushed-in position of rotation.

The leaf 18 is movable with the aid of the slide rails 19, 20 between two end positions, an outer pulled-out position (FIG. 1) and an inner, retracted position (FIG. 2). The leaf 18 is pulled out to the outer position when work is to be carried out on the computer terminal but is slid to the inner position when the stand is to be rotated (see FIG. 2). In the inner position, the leaf 18 will nest in the cut-out segment of the shelf 16 and be located entirely within the boundaries of the circle defined by the stand. As a result, the stand may be rotated freely and unobstructedly without the lead interfering with or bumping against any objects 36 placed laterally of the stand.

Figure 3:
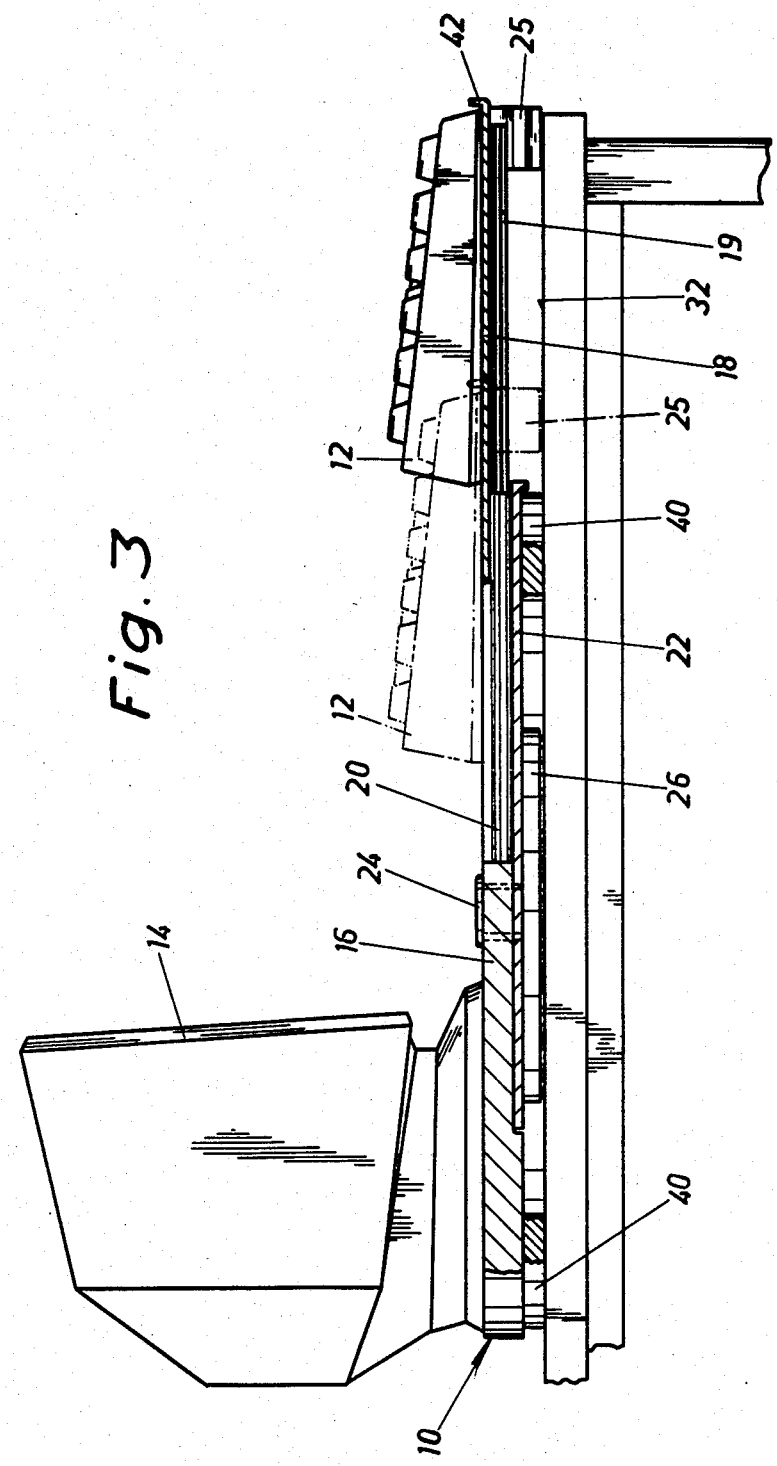
FIG. 3 is a lateral view of the stand.
Figure 4:
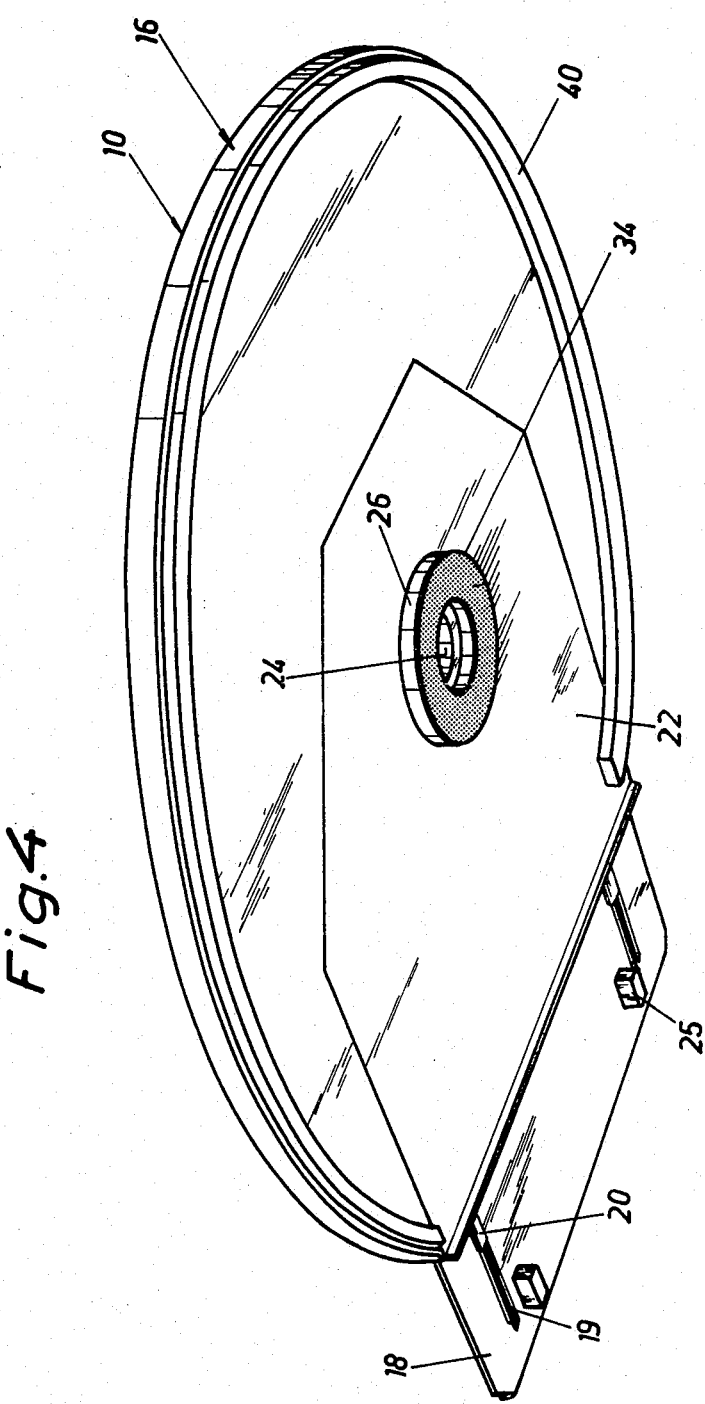
FIG. 4 is a view from below of the stand.

FIG. 3 illustrates the two end positions of the leaf 18. The outer, i.e., the working position, is shown in continuous lines, while the inner, i.e., the position of rotation, is shown in phantom lines. In the inner position of the leaf 18, the feet 25 on the lower face thereof are arranged to go clear of the support 32, e.g., a table top, in order not to prevent rotation of the stand. In the outer position, the feet 25 engage with the table top in order to back up the leaf and stabilize it when work is being carried out on the computer.

The shelf 16 of the rotary stand in accordance with the invention is provided wth a support ring 40 in the manner appearing from FIGS. 1 and 2. This support ring 40 is mounted on the lower face of the shelf 16 along the periphery of the latter and the thickness of the ring is slightly inferior to the height of the thrust bearing 26 in order not to prevent rotary movements of the rotary stand. The support ring 40 prevents tilting movements of the shelf 16 by moving into abutment against the support 32 upon the occurence of any tilting tendency in the shelf. Preferably, the support ring 40 is made from or is covered with a felt material or a similar material.

As has been noted, in the illustrated embodiment, the height of the support ring 40 is something slightly less than that of the thrust bearing 26 so that the support ring 40 will normally be out of engagement with the support 32. However, if desired, the support ring 40 may have a height substantially equal to that of the bearing 26 so that the support ring 40 will always be in light rubbing engagement with the support 32.

The connections of the terminal 12, 14 are drawn through the central aperture 24. This becomes possible because the rotary stand 10 is positioned on top of two tables or a double-table and by drawing the connections through a gap between the tables. When the rotary stand 10 is positioned on a single table, the connections are drawn to the side of the stand.

The shelf 16 of the rotary stand 10 is positioned at a lower level than are corresponding shelves in conventional rotary stands, with the result that the rotary stand 10 is ergonomically well suited for use as a work table for example, computer terminals. The rotary stand 10 in accordance with the invention has its center of gravity at a lower level and is more stable than conventional rotary stands or rotary work tables. The rotary stand 10 may be positioned close to the table edge with part of the shelf 16 and even part of its thrust bearing 26 projecting beyond the table edge without this making the stand 10 unstable. Rotary stands designed in accordance with conventional technology comprising a thrust bearing which is mounted on a cross member which is positioned on top of a table in such a manner that one or several arms of the cross project beyond the table top become unstable and tend to tilt. The possibility that the subject invention offers of positioning the rotary stand with its thrust bearing 26, 54 partly projecting behynd the table top also means that the rotary stand will require less space on the table top than do conventional rotary stands.

The use of a rotary stand 10 in accordance with the subject invention as a computer terminal supporting top provides a number of essential advantages. The display may be positioned to the rear of the computer terminal and thus will be spaced some distance away from the terminal operator. A safety distance of 70 cm could easily be obtained. The leaf 18 on which the keyboard 12 is positioned may be pulled out and retracted to the desired position with unimpaired stability. When the computer terminal is not in use, it may easily be pivoted to direct radiation from the display in a direction where it causes no harm.

On its front edge, the leaf 18 is provided with an upwardly directed flange 42 to indicate a distinct position for the keyboard and prevent the latter from sliding off the leaf 18. The keyboard may easily be tilted to the desired position. If desired, a similar upwardly directed flange (not shown) may be provided at the rear edge of the leaf 18 so as to positively locate the keybqard 12.

The work table/rotary stand in accordance with the invention makes it possible to turn the display 12 around easily for demonstration purposes, education, during conferences and at other occasions when a number of persons are to take part of the information shown on the display.

The embodiments of the invention described above are to be regarded as examples only and a number of other modifications and embodiments are possible within the scope of the appended claims. The leaf 18 may be mounted in the stand 10 by means of a telescope structure, allowing it to be pulled out even farther away from the rotary stand.

What is claimed is:

1. An improved rotary stand for a computer terminal or the like comprising a support disc adapted to support a computer display or its upper face, a thrust bearing provided on the lower face of said support disc, said thrust bearing consisting of two relatively rotatable sections one of which rests in substantially direct contact with a base, such as a table, said rotary stand being configured to serve as a working table to support the computer comprising a display and a keyboard, the improvement comprising said support disc provided with a leaf for support of the computer keyboard, said leaf slidably supported by said support disc to be pulled outwards from the support disc into a keyboard utilizing position, in which position said leaf having supporting means to abut against the base upon which said support disc is positioned and prevent rotation of said support disc, said leaf being arranged to be displaced from the pulled-out keyboard utilizing position inwards over the support disc wherein said supporting means is out of contact with the base to facilitate rotation of the rotary stand and setting thereof in a different angular position.

2. A rotary stand as claimed in claim 1, wherein said supporting means comprises feet provided on the lower face of said leaf, said feet being arranged to abut against the base only when said leaf is in its pulled-out position corresponding to the keyboard utilization position.

3. A rotary stand as claimed in claim 1, comprising a support ring provided on the lower face of said support disc, said support ring having a height slightly smaller than the height of said thrust bearing and adapted to engage the base for limiting tilting of said support disc.

4. A rotary stand as claimed in claim 1 wherein the support disc has a generally circular configuration with a cutout formed in one side thereof in which the leaf is supported, said cutout and said leaf being configured so that when said leaf is in its inward position, it does not extend beyond the radius of the circular portion of said support disc.

5. A rotary stand as claimed in claim 4, wherein said supporting means comprises feet provided on the lower face of said leaf, said feet being arranged to abut against the base only when said leaf is in its pulled-out position corresponding to the keyboard utilization position.

6. A rotary stand as claimed in claim 5, comprising a support ring provided on the lower face of said support disc, said support ring having a height slightly smaller than the height of said thrust bearing and adapted to engage the base for limiting tilting of said support disc.

7. A rotary stand as claimed in claim 1 wherein the leaf has an upturned flange at its outer peripheral edge for retaining a keyboard thereupon.

8. A rotary stand as claimed in claim 7 wherein said supporting means comprise feet provided on the lower face of said leaf, said feet being arranged to abut against the base only when said leaf is in its pulled-out position corresponding to the keyboard utilization position.

* * * * *